O. N. PERKINS.
LAMP-FILLING CAN-TOP.
No. 171,165.                    Patented Dec. 14, 1875.
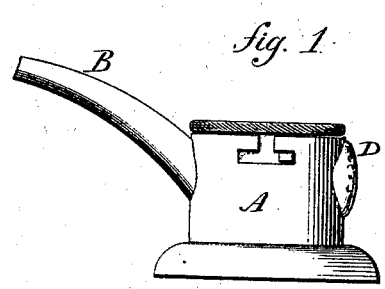
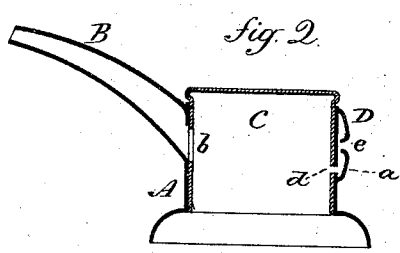
Witnesses:                      Orson N. Perkins
                                        Inventor
                                By Atty.

UNITED STATES PATENT OFFICE.

ORSON N. PERKINS, OF WEST MERIDEN, CONNECTICUT, ASSIGNOR TO EDWARD MILLER & CO., OF SAME PLACE.

IMPROVEMENT IN LAMP-FILLING-CAN TOPS.

Specification forming part of Letters Patent No. 171,165, dated December 14, 1875; application filed November 30, 1875.

*To all whom it may concern:*

Be it known that I, ORSON N. PERKINS, of West Meriden, in the county of New Haven and State of Connecticut, have invented a new Improvement in Lamp-Filling-Can Tops; and I do hereby declare the following, when taken in connection with the accompanying drawings, and the letters of reference marked thereon, to be a full, clear, and exact description of the same, and which said drawings constitute part of this specification, and represent, in—

Figure 1, side view; Fig. 2, vertical central section.

This invention relates to an improvement in that class of lamp-filling-can tops, in which there are two registered openings—one for pouring and the other for ventilation or air-inlet—both of which are opened so the pouring may be free.

With this air-inlet unprotected, the oil is liable to "spirt" through the opening when the can is tipped, and then drip down the outside, which makes a serious objection to to this class of tops.

The object of this invention is to overcome this difficulty; and it consists in providing the air-inlet opening with a trap which, while covering the opening, will allow the air freely to pass through into the can.

While applicable to all cans having the exit and the air-inlet openings, I show it as applied to an external cylinder, A, on one side of which is the pouring-spout B, and on the opposite side the air-opening $a$, and within the cylinder is a second cylinder or plug, C, with an opening, $b$, corresponding to the opening of the spout, and an opening, $d$, corresponding to the air-opening $a$, so that when the plug is turned to bring these openings to register with each other the oil may be poured through the spout, and, at the same time, air flow in through the opening $a$. Over the opening $a$ a disk, D, is placed, and attached by its edge to the cylinder A. The disk is made concave upon its inside, so as to form a chamber between it and the cylinder, and through this disk is a perforation, $e$, out of line with the perforation $a$ preferably above it, the perforation $a$ being best made near the lower part of the chamber, within the disk, and it is best that the edge around the perforation $e$ be turned inward; hence, the oil which spirts through the opening $a$ is arrested by the disk and at once drips back through the opening $a$ into the can.

As before stated, this trap is applicable to most of the vents provided for this class of can-tops.

I claim—

In combination with the air-vent of a lamp-filling-can top, the perforated trap D over the said vent, substantially as and for the purpose specified.

ORSON N. PERKINS.

Witnesses:
 W. H. PERKINS,
 F. S. WILLIAMS.